United States Patent Office 3,533,207
Patented Oct. 13, 1970

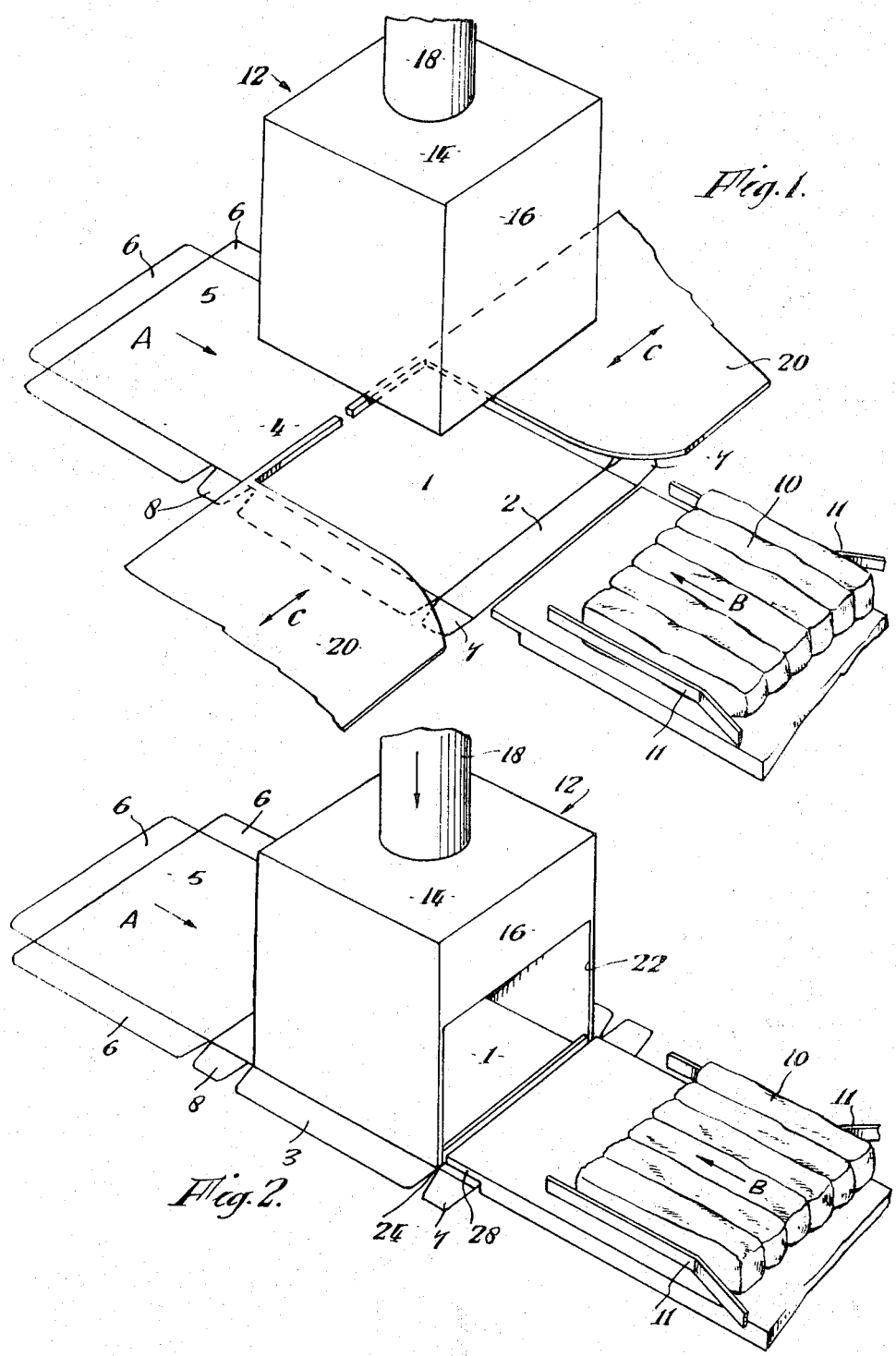

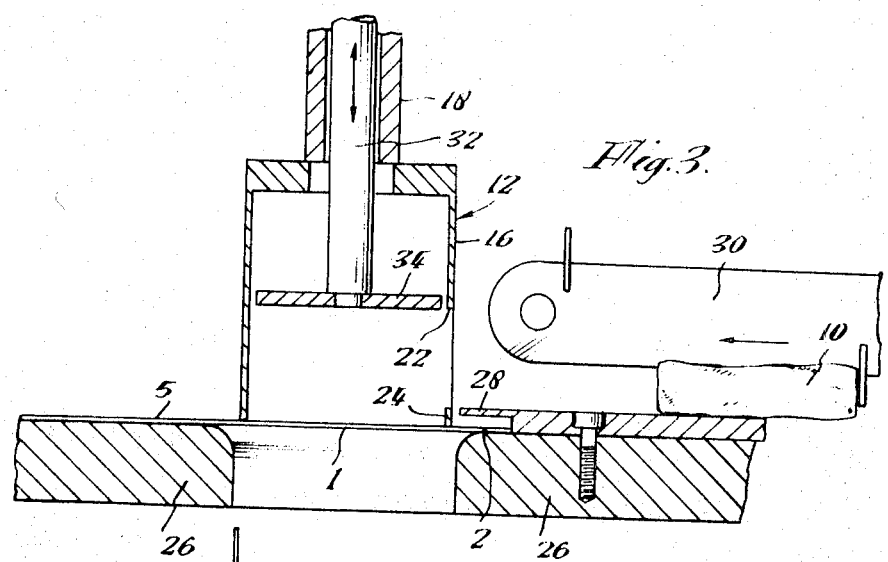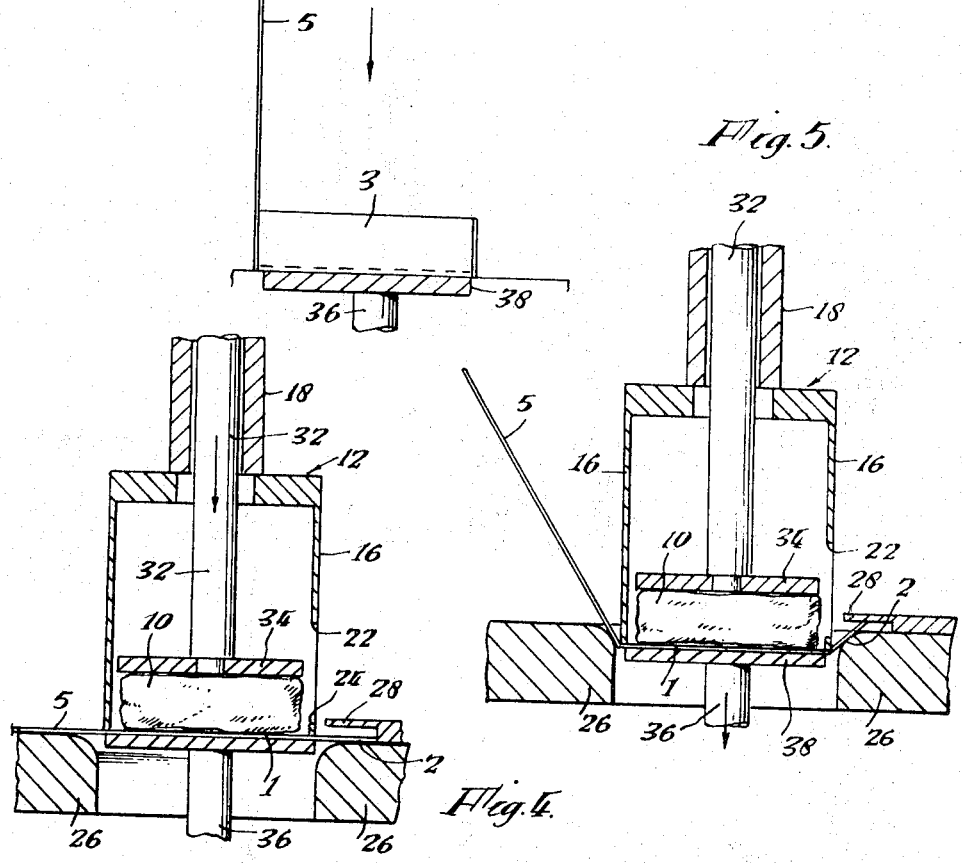

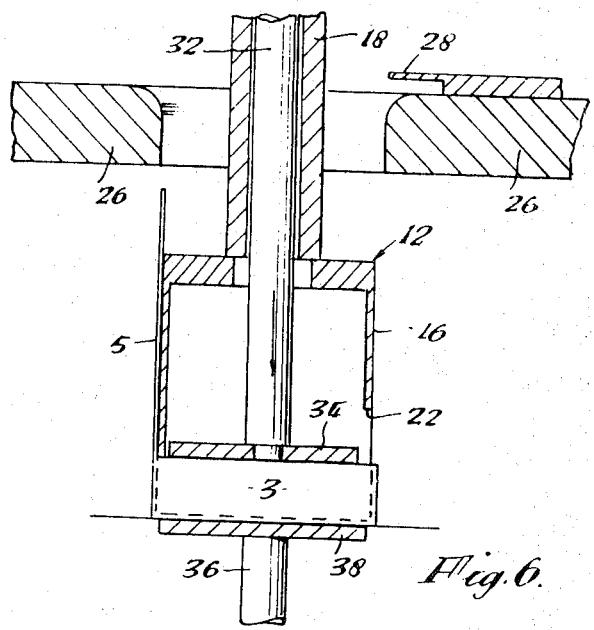
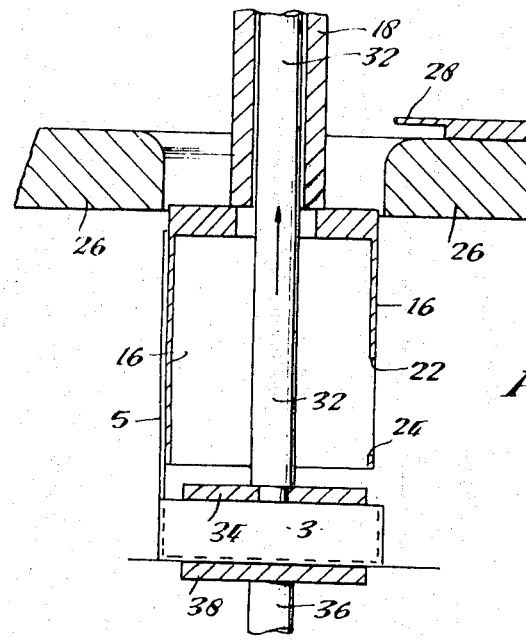

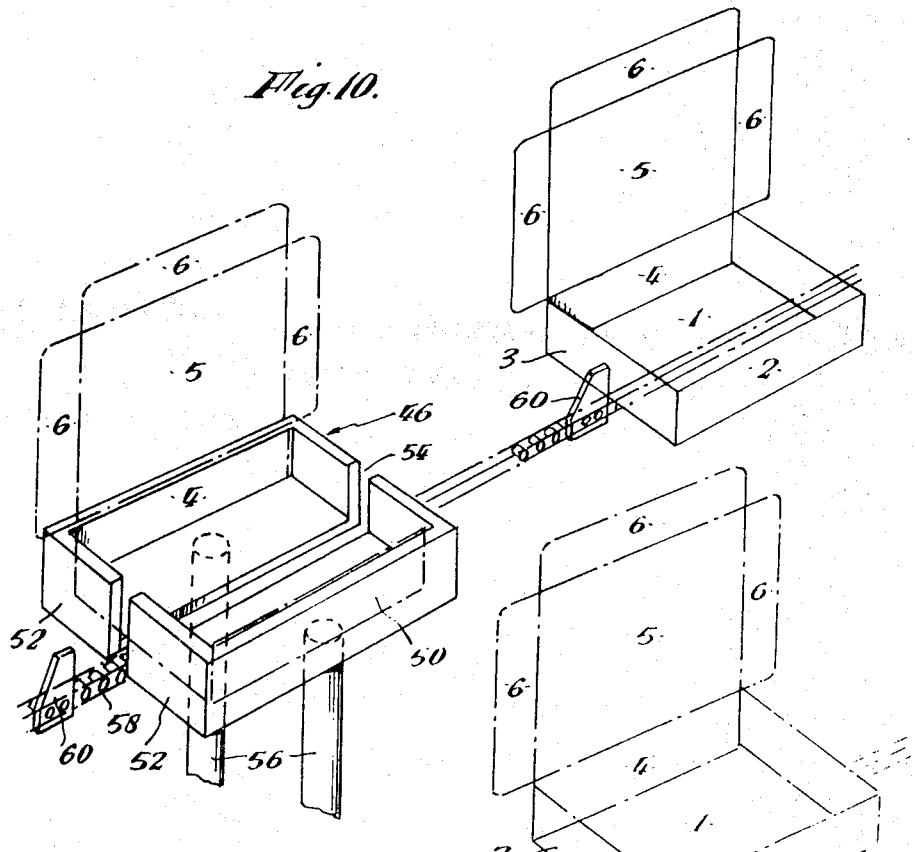
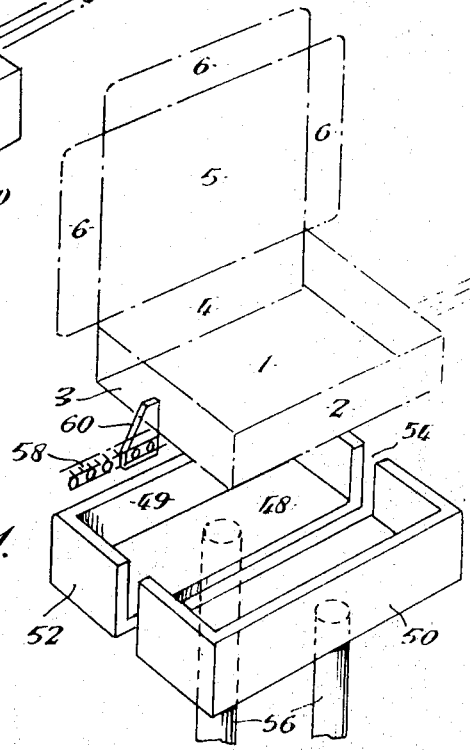

3,533,207
CARTON FORMING AND FILLING MACHINE
Arthur John Freemantle, Cleethorpes, and Jack Jones, Courtfields, Keynsham, Bristol, England, assignors to E S & A Robinson Limited, Bristol, England
Filed Feb. 13, 1967, Ser. No. 615,595
Claims priority, application Great Britain, Feb. 16, 1966, 6,778/66
Int. Cl. B65b 47/04
U.S. Cl. 53—3    5 Claims

ABSTRACT OF THE DISCLOSURE

A carton forming and filling machine has a die over which a scored carton blank is fed. Positioned over the die is a reciprocating hollow head plunger open at its leading end and the size and shape of the bottom of the carton to be formed and of the die opening. A reciprocating inner member is within the hollow head. There is a feed of an article or articles to be packaged that positions same on the bottom of the carton blank before forming and before the head moves into position or through a side opening in the hollow head. A movable support is positioned within the die and under the bottom portion of the carton which is moved into position within the die under the carton bottom. The hollow head moves onto the carton blank at the fold lines of the bottom and pushes same with the article or articles thereon into the die against the support to form the carton with its contained material. The inner reciprocating member may be brought to adjacent the material to hold the material in position in its carton as the hollow head is withdrawn. There is a take away conveyor associated with the movable support that the formed package with its material therein may be deposited upon.

---

This invention relates to a carton forming and filling machine, the carton being formed from a blank of the kind having the bottom panel and wall panels connected to the bottom panel through lines of weakening.

One usual way of erecting such a carton is to feed the cut and creased carton blank to the open top of hollow die and to provide a reciprocating plunger conforming to the shape of the bottom panel of the carton blank, whereupon the side walls of the carton blank are caused to take up a position at right angles to the carton bottom and during the passage through the hollow die the side walls of the carton are adhered or locked together. The carton thus erected and formed is then filled and subsequently closed.

The object of the invention is to provide a carton forming and filling machine in which a set of articles can be regimented and packaged in a carton.

According to this invention, instead of the plunger described in the preceding paragraph, we provide a plunger in the form of a hollow head with an open leading end the peripheral edge of which conforms to the outline of the bottom panel of the carton. The product to be packaged is placed on the said bottom panel before the hollow head pushes the carton blank into the die, the sides of the carton being erected around the hollow head. In order to support the bottom panel of the carton during its passage through the die and, if necessary, the blank while the product is being placed thereon, a platform may be provided which is brought into position under the bottom panel of the carton and supports this in its passage through the die.

The product to be packaged can be introduced through an opening in one of the side walls of the hollow head itself positioned on the carton or can be introduced onto the bottom panel of the carton blank while the hollow head is raised above the blank in which case means are provided for holding the product within the area of the bottom panel until the hollow head contacts the carton and encompasses the product.

Two forms of carton forming and filling machine made according to this invention are illustrated in the accompanying diagrammatic sketches in which:

FIG. 1 is a perspective view of one form of hollow head.

FIG. 2 is a perspective view of a second form of hollow head.

FIGS. 3 to 7 are side sections showing five stages of operation.

FIGS. 10 and 11 are perspective views of the means for conveying away the filled cartons showing two stages of the operation.

Figure 8:
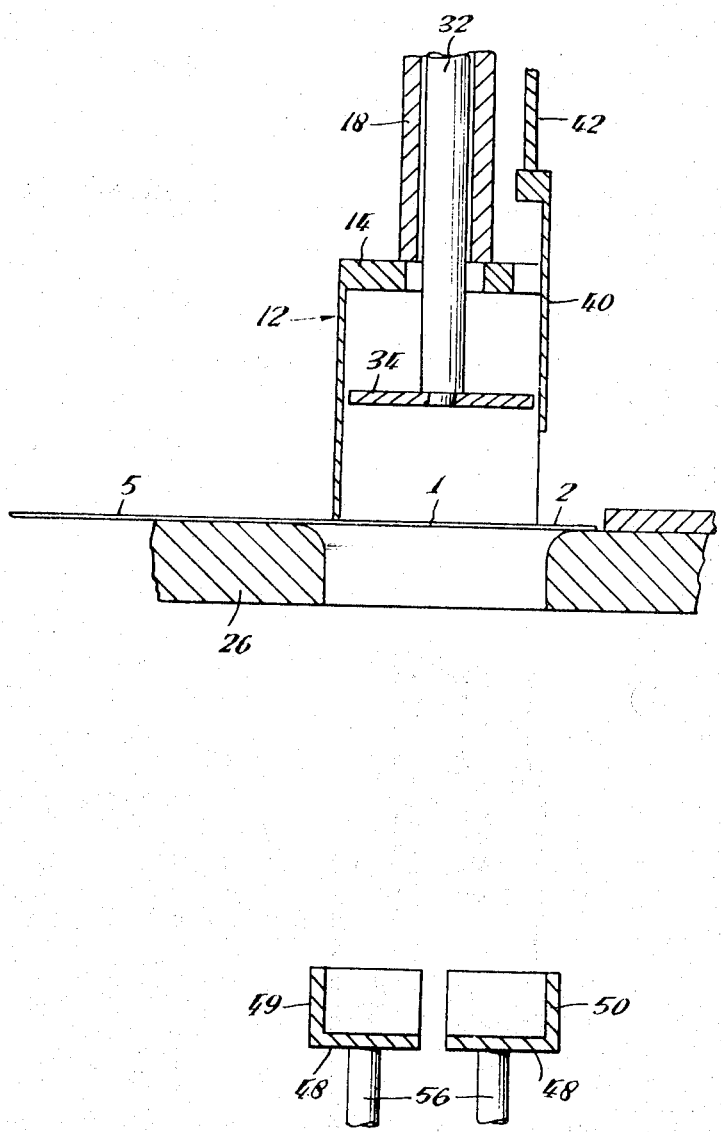
FIG. 8 is a side section showing two modifications.

Referring to the drawing a blank, best seen in FIG. 1, comprises a bottom panel 1, a front wall panel 2, side wall panels 3, a rear wall panel 4 and a lid hinged to the panel 4 having a top 5 and wall panels 6. When the carton is erected the projecting ends 7 and 8 of the panels 2 and 4, are adhered to the wall panels 3.

The carton shown in FIG. 1 is fed in the direction of the arrow A to the position shown at the top of a die described later. The product to be packaged, in this case fish sticks 10, are fed through guides 11 in the direction indicated by the arrow B to take up a position on the panel 1 of the carton blank. A hollow head generally indicated at 12 comprises a top 14, side walls 16 and has an open bottom, and is moved up and down by means of the ram 18. In FIG. 1 the hollow head 12 is shown in the raised position prior to the product being fed onto the panel 1. The product to be packaged is pushed onto the panel 1 and is held in such position by means of reciprocating side plates 20 which hold the product in position and then withdraw just prior to the point when the hollow head 12 makes contact with the carton blank. The movement of the plates 20 is indicated by the arrow C.

Referring to FIG. 2 this shows the case where the product is fed through a window 22 in one of the wall 16 of the hollow head 12. It should be noted that the window 22 does not extend to the bottom of the wall 16 and an area 24 extends along the bottom of the wall 16, the bottom edge of which is adapted to bear upon the panel 1 of the carton with the lower edges of the unapertured walls 16. In this modification, it is not necessary to remove the head 12 while the product is being fed to the carton blank.

Referring now to FIGS. 3 to 7, the operation is described with reference to filling the hollow head 12 through the window 22 in a side wall 16 as shown in FIG. 2. In FIG. 3 one carton seen at the bottom of the figure, has just been filled and formed, and is ready for conveying to the next operation. A second carton blank has been fed to a position at the top of the die 26 and it will be noted that the front wall 2 of the carton blank lies under a flange 28 on the machine. The product 10 is about to be fed onto the bottom panel 1 of the carton blank by the product feed means indicated generally at 30. The ram 18 is hollow and houses a second independently moving ram 32 at the end of which there is a rectangular plate 34 which can move within and through the hollow head 12.

As soon as the formed carton shown in FIG. 3 has moved from the position shown to the next operation, a support platform rises into the position shown in FIG. 4. under the bottom of the carton blank. The support platform comprises an upright reciprocating member 36 and a horizontal platform 38 at its upper end. As soon as the support platform 38 is raised to the position shown in FIG. 4, the plate 34 is made to bear on the product 10 and now the hollow head 12 descends taking with it the plate 34. The support platform 38 descends at the same time. The bottom 1 of the carton blank and the product 10 are sandwiched between the plate 34 and the platform 38. As the hollow head 12 enters the die 26 the front panel 2, side panels 3 and back panel 4 together with the lid 5 are raised into a vertical position. It must be understood that means are provided for uniting the tabs 7 and 8 to the sides 3 of the carton around the hollow head 12 during the passage through the die. These means can be provided by the application of hot melt adhesive to the projecting tabs 7 and 8 of the carton blank as they move out of the horizontal. Other forms of adhesive may be used, or the tabs may be heat sealed to the side wall if the carton bears a heat sealing adhesive or coating. A third method is to interlock the tabs with side walls, or again in some circumstances the sides can be stitched during the passage through the die. Means are also provided in the die for bringing the front and back walls of the carton into an upright position before the side walls so that these are raised in the correct order for sealing, this feature being well-known in carton forming machines.

FIG. 5 shows the hollow head 12 and carton descending into the die.

FIG. 6 shows the carton at the bottom of the die.

The hollow head 12 is at its lowest position with the lower edge portion inside the formed and filled carton. The plate 34 still bears upon the product in the carton while the hollow head 12 is being withdrawn. The object of this is to remove the filled and formed carton from the hollow head whilst the hollow head is withdrawn from the inside of the carton. This is shown best in FIG. 7. Finally, the plunger 32 carrying the plate 34 is withdrawn and the filled carton proceeds to the next operation. As soon as the hollow head rises above the open top of the die another carton blank is introduced into the position shown in FIGS. 1, 2 and 3 and the filling and forming operation can begin again.

Figure 9:
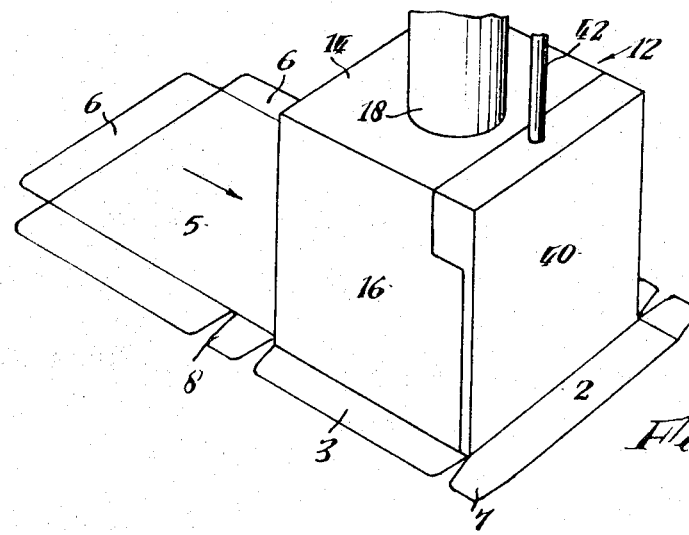
FIG. 9 is a perspective view of the hollow head shown in FIG. 8.

If desired the hollow head 12 can be made in two parts as illustrated in FIGS. 8 and 9. The front wall of the head 12 and part of the top wall 14 is formed as a separate shutter 40 which is independently movable in a verticle direction by means of the ram 42. In use, the shutter is raised in order to introduce the fish fingers 10 onto the carton bottom 1 and is then closed before the head 12 moves downwardly with the shutter 40 in position to bend and form the carton. This position is shown in FIG. 9.

Instead of the platform 38 a reciprocating transport device 46 is provided for placing the filled carton on a conveyor travelling to a carton closing machine. In this case means are provided for supporting the bottom of the carton while the product is being placed in position on it and while the carton is passing through the die 26. These means may comprise arms pivoted on the bottom surface of the die 26 and terminating in supports bearing on the bottom of the carton. As the carton passes through the die 26 the arms gradually retract and the carton is deposited in the transport device 46. This is diagrammatically shown in FIGS. 8, 10 and 11. The transport device 46 comprises a bottom 48, back wall 49 and front wall 50 and side walls 52. The device 46 is made in two parts so as to provide a central slot 54 extending through the walls 52 and bottom 48 and is mounted on reciprocating plungers 56 capable of moving in a vertical direction. The device 46 is restrained from moving in any other direction except vertically. A chain conveyor 58 is provided to move horizontally between the two plungers 56. The conveyor 58 has lugs 60 provided at intervals to bear on the side walls 3 of the cartons.

In use, the formed and filled carton is pushed into the device 46 by the plate 34 and the device 46, with the filled carton, then descends into the position shown on the left-hand side of FIG. 10. As the device 46 moves down further into the position shown in FIG. 11 the filled carton is no longer held in the device 46 but is carried away by the lugs 60 on the chain conveyor diagrammatically shown at the right hand side of FIG. 10. FIG. 11 shows the device 46 having moved away from the carton. As soon as the carton has been moved by the conveyor into a position clear of the device 46 as shown at the right of FIG. 10 the device 46 rises again into a position under the die 26 and the next filled carton is brought to the conveyor by the transport device as previously described.

Figure 12:
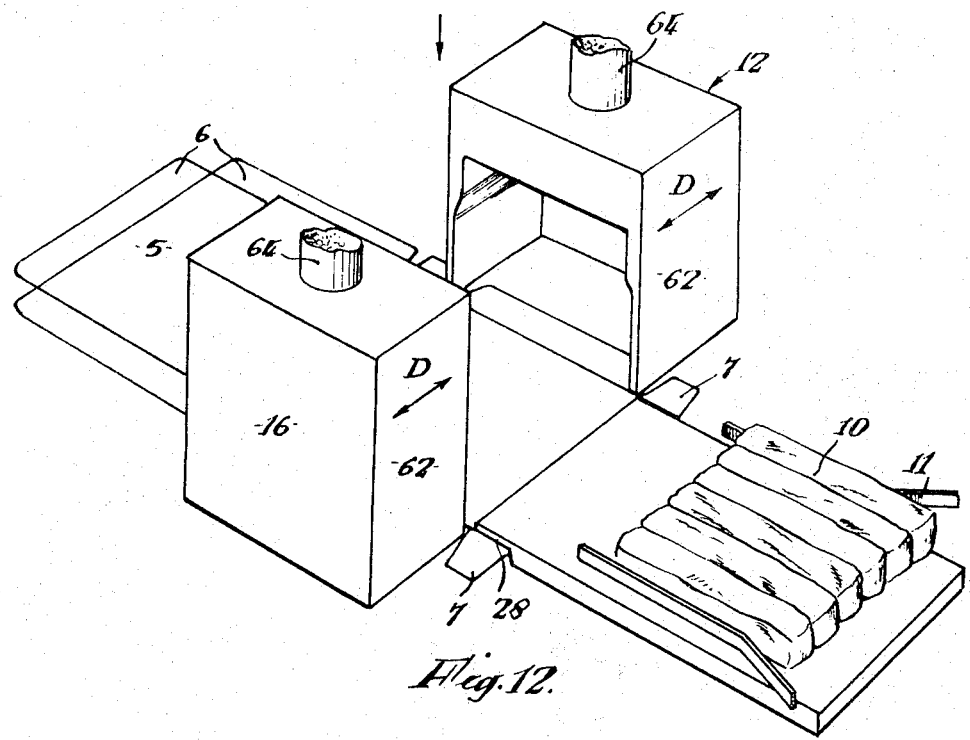
FIG. 12 is a perspective view of a still further modified form of hollow head.

According to the modification shown in FIG. 12, the hollow head 12 is made in two halves 62 each having its own plunger 64, means are provided for moving the two halves horizontally away from and towards each other in the direction indicated by the arrows D. The fish sticks 10 are moved onto the bottom 1 of the carton while the two halves of the head are in the position shown in FIG. 12, whereupon the two halves are caused to close together, the plungers 64 being operated in unison to move the head into the die 26 as previosuly described.

Although the invention has been described with reference to a vertically operated plunger it is to be understood the plunger can be made to reciprocate horizontally and the associated parts adapted accordingly. The term bottom panel used in the specification and claims is intended to mean that panel of the carton which enters the die first.

What we claim and desire to secure by Letters Patent is:

1. In an apparatus for forming and filling cartons, the combination of a die having an opening to provide a depending pocket of substantially the bottom area of the carton to be formed, a plunger with a linear axial reciprocating motion, said plunger having a hollow head with an open leading end adapted to engage the bottom panel of the carton blank to push it into said pocket, the said head providing a former for the erection of the carton, means for regimenting a set of articles to be packaged on the bottom of the blank so as to lie wholly within the hollow head before the carton is formed and means for supporting the said bottom panel and the set of articles thereon prior to and during its passage into the die.

2. In an apparatus for forming cartons, the combination of a die having an opening to provide a depending pocket of substantially the bottom area of the carton to be formed, a plunger having a hollow head with a linear axial reciprocating motion adapted to engage the bottom panel of the carton blank to push it and the carton formed into and through said pocket, means for positioning the product to be packaged on the carton bottom so as to lie wholly within the hollow head before the carton is formed whereby to form the carton about the head and means for supporting the bottom of the carton and the product therein during its passage through the die, said hollow head having a plurality of wall panels, one of said wall panels having an aperture through which the product to be packaged is introduced onto the bottom of the carton blank.

3. In an apparatus for forming cartons, the combination of a die having an opening to provide a depending pocket of substantially the bottom area of the carton to be formed, a plunger having a hollow head with a linear axial reciprocating motion adapted to engage the bottom panel of the carton blank to push it and the carton formed into and through said pocket, means for positioning the product to be packaged on the carton bottom so as to lie wholly within the hollow head before the carton is formed whereby to form the carton about the head and means for supporting the bottom of the carton and the product therein during its passage through the die, said hollow head being formed as two independently movable parts, one part comprising walls of the hollow head and the other a piston reciprocable within the hollow head.

4. Method of forming and filling a carton with a set of articles by means of a plunger and cooperating die means, the said carton having a bottom portion and side walls joined thereto through weakened lines, the said die means leaving an opening to provide a pocket of substantially the bottom area of the carton to be formed and the said plunger having a hollow head and an open leading end of substantially the same area as the carton bottom, the method consisting in applying the carton blank to the said opening, applying said hollow head to the blank before the articles are placed on the blank bottom, placing the articles to be packaged in formation on said bottom, pushing the carton into and through said die means by the plunger, the walls of which enclose the set of articles, the leading open end of the hollow head breaking the said weakened lines whereby the carton is formed about the head and set of articles and the side walls are pressed by the die means into abutting relationship with the head.

5. Method according to claim 4 including the step of applying pressure to the articles in a direction towards the carton bottom to hold said articles on said carton bottom.

References Cited

UNITED STATES PATENTS

| | | | |
|---|---|---|---|
| 2,096,278 | 10/1937 | Huebsch et al. | 53—34 X |
| 3,086,337 | 4/1963 | Engleson et al. | 53—222 X |
| 3,103,772 | 9/1963 | Anderson | 53—192 |
| 3,146,565 | 9/1964 | Otto | 53—192 |
| 3,354,600 | 11/1967 | Hoffman | 53—34 X |

FOREIGN PATENTS

| | | |
|---|---|---|
| 1,146,800 | 4/1963 | German. |
| 955,805 | 4/1964 | Great Britain. |

THERON E. CONDON, Primary Examiner

N. ABRAMS, Assistant Examiner

U.S. Cl. X.R.

53—192, 222